J. T. CLARKE.
INSTRUMENT FOR INDICATING VERTICALITY OR ORIENTATION.
APPLICATION FILED AUG. 1, 1918.

1,306,882.

Patented June 17, 1919.
2 SHEETS—SHEET 1.

J. T. CLARKE.
INSTRUMENT FOR INDICATING VERTICALITY OR ORIENTATION.
APPLICATION FILED AUG. 1, 1918.
1,306,882.
Patented June 17, 1919.
2 SHEETS—SHEET 2.
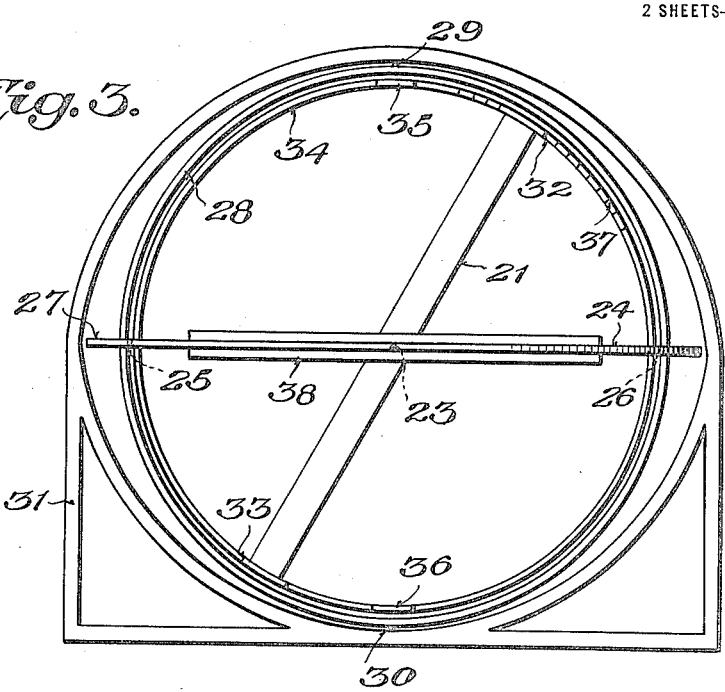
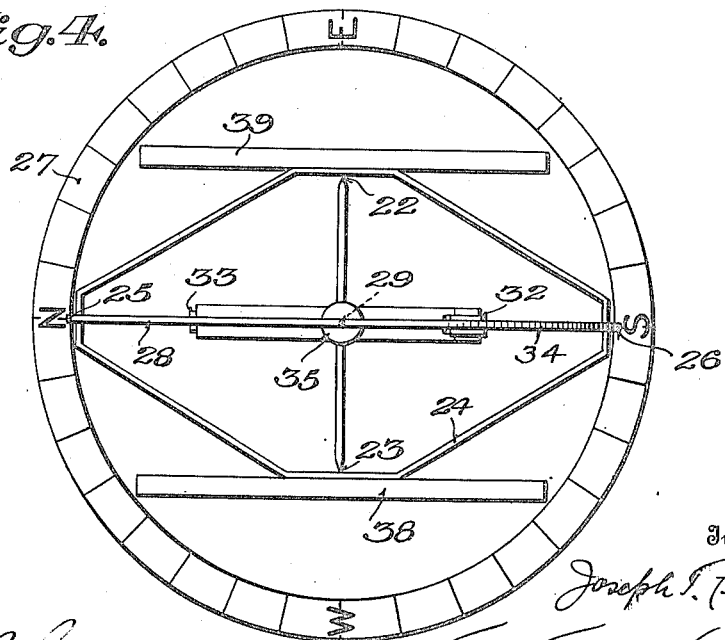

UNITED STATES PATENT OFFICE.

JOSEPH THACHER CLARKE, OF HARROW, ENGLAND.

INSTRUMENT FOR INDICATING VERTICALITY OR ORIENTATION.

1,306,882.  Specification of Letters Patent.  Patented June 17, 1919.

Application filed August 1, 1918. Serial No. 247,324.

*To all whom it may concern:*

Be it known that I, JOSEPH THACHER CLARKE, a citizen of the United States of America, and residing at Harrow, Middlesex, in England, have invented certain new and useful Improvements in Instruments for Indicating Verticality or Orientation, of which the following is a specification.

This invention relates to an improved instrument for indicating verticality or orientation, its primary object being the construction of such an instrument so that the effects of gravity and acceleration upon the accuracy of its indications are as far as possible eliminated the instrument thus being suitable for use on an aeroplane or other body which rapidly changes its position in space.

The principle upon which the invention is based is that of suspending a bar magnet accurately balanced in all planes in such wise that it is free to move in any direction except that of rotation upon its own axis and of attaching to this magnet two pointers or indicators, likewise balanced, at right angles to one another, these indicators being so adjusted upon the magnet in relation to its angle of dip as to designate verticality and, in the horizontal plane, the circle of orientation.

The magnet may be suspended by centering it upon pivots and allowing these to play within gimbal rings; or it may be attached to a float having a specific gravity lower than that of a liquid contained in a spherical vessel, the weight of the operative system, taken as a whole, being so adjusted that this has as nearly as possible the same specific gravity as has the liquid in which it is immersed and by which it is so supported that no pressure is exercised upon either the top or the bottom of the container. Suspended by either of these methods the magnet will be free to turn in any direction.

The freedom of movement dependent upon axial balance must, however, as before stated, be subject to one restriction: the magnet must be prevented from rotating upon its own axis independently of displacement of the supporting gimbals or container, inasmuch as such rotation would throw the indicators out of verticality and horizontality. To meet this requirement the balance of the system is delicately adjusted in such wise that the side thereof which is below and to the south of the inclined magnetic needle is slightly heavier than is the side which is above and to the north of the needle. This weighting of one side of the system should be no greater than the modicum which will suffice to prevent the needle from accidental rotation around its own axis, inasmuch as all unbalanced weight in the system would tend to expose this to the deflecting action of centrifugal fling which it is the purpose of this invention to eliminate.

One convenient method of carrying the invention into effect is to form the float as a sphere, or like symmetrical body, in which the magnet is axially embedded; to attach to this float indicating rings at right angles to each other, bearing degree marks designating the vertical and the horizontal; to provide for an adjustment of these indicators upon the magnet when setting the instrument for use on a given isoclinal line; and to suspend this system in liquid contained in a loosely-fitting spherical vessel of transparent glass marked with lubber line and concentric circles from which the orientation and the tilt of the apparatus can be read in accordance with the position of the movable parts inclosed therein. There may, obviously, be any number of dip-magnets employed in such a system if the needles be arranged in gravitational balance; but in the detailed descriptions hereinafter given this controlling element will be referred to as a unit.

The apparatus is more particularly intended for use in aeroplanes where the sense of direction is liable to be disturbed by the centrifugal fling induced by the wheeling movement of the inclined plane during the act of turning in the air, or, as it is technically termed, banking. In the accompanying drawings, Figure 1 is a side view of an apparatus of the gravity-controlled and floating type looking east, the containing vessel being shown in axial section.

Figs. 3 and 4 are similar views of another construction of instrument according to this invention.

Figure 1:
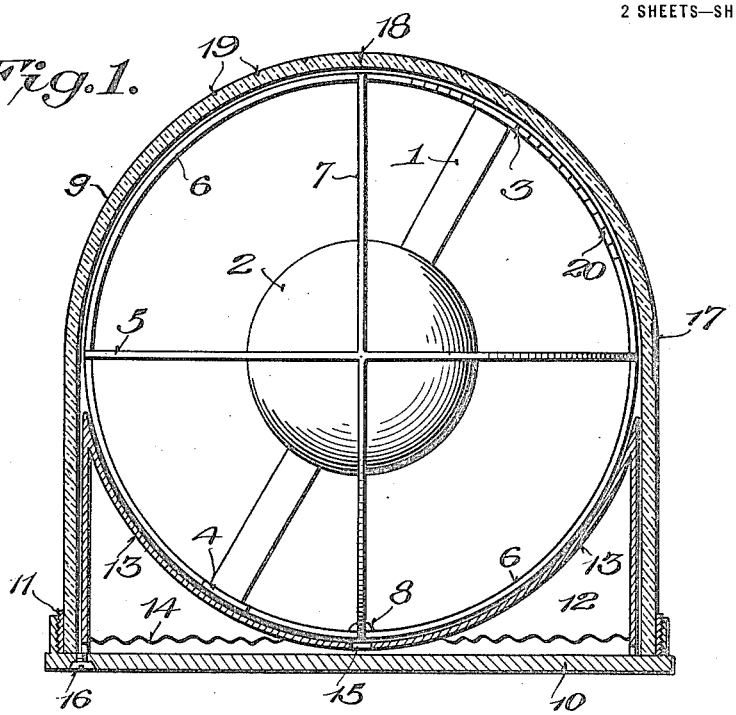
Figure 2:
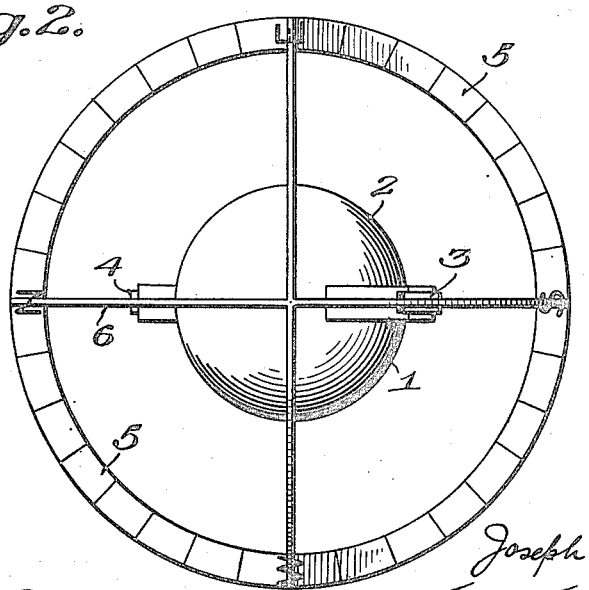
Fig. 2 is a view of the operative system from above.

With reference first to Figs. 1 and 2 the strong bar magnet 1 passes diametrically through the hollow spherical float 2, being accurately balanced in all planes. To the ends of the magnet is attached, rigidly but adjustably, by means of the slide sockets 3 and 4, a light armillary sphere, formed of three rings in the three dimensions of space, namely the horizontal equatorial 5 and the N. S. and E. W. meridians 6 and 7. This sphere, which has the function of an indicating framework, is, taken by itself, not in absolute all-round balance, being very slightly heavier upon its lower or southern side. The lowering of the center of gravity is effected by attaching an extremely light weight 8 at the nadir crossing of the meridional rings—or, what amounts to the same thing but is not so conveniently illustrated, by making the wire of the meridional rings of slightly larger section at the nadir than at the zenith. The entire system, consisting of magnet, float, and indicating frame, has the same specific gravity as the liquid in which it is suspended. This liquid, not shown, is suitably chosen as regards its viscosity and low freezing point, is inclosed in a container 9, formed of transparent glass, having a brass cover 10 which screws upon a band 11 cemented to the glass. Attached to the cover is a brass air chamber 12, the upper side 13 of which is curved in conformity with the hemispherical end of the glass container, while its lower side 14 is of thin metal, corrugated to allow the expansion of the liquid surrounding it. The air chamber is pierced at the point 15 to facilitate the escape of air bubbles, during filling. The liquid is introduced through the hole 16 which is closed by a stopper screw when the last bubble of air has left the container. Upon the outside of the glass container is drawn a lubber line 17 by comparison with which the marks of orientation are read.

The weight 8 serves, as before stated, to prevent the magnet from rotating on its own axis, and does this by slightly lowering the center of gravity. It thus forms, theoretically, a weak pendulum. As, however, the magnet has no inherent tendency thus to rotate, this weight may be so light that it will not be appreciably affected by centrifugal fling, or that, if so affected, it will have a periodicity of movement through the liquid so slow that this will be counteracted by the rapid changes in inclination of a wheeling aeroplane, and will hence not go far enough to interfere with good average readings.

Examining more closely the question as to how great the unbalanced weight must actually be in order to insure such a gravity control, it becomes evident that this ultimately depends upon the strength of the skin friction exercised by the liquid between the walls of the container and the operative parts of the apparatus floating therein: since nothing but drag induced by rotary movements of the container and transmitted through this skin friction can have any tendency to disturb the position of the framework floating in perfect equilibrium in a liquid of the same specific gravity. It is furthermore evident that a magnet affixed in a horizontal position to the framework and of sufficient strength to retain or replace this in a given orientation would answer the requirements of counteraction. As a result of these considerations the answer will be that that weight will suffice which, acting on the given leverage, is requisite to cause a magnet of the specified strength to assume a horizontally balanced position, as do the needles of ordinary compasses. This weight, calculated within the practical limits of length and thickness in such a compass needle, can be proved to be exceedingly small. And it is clear that, so light a counterbalance would, in its passage through the supporting liquid under the impetus given by the acceleration of an aeroplane, have a rate of travel so slow that the aeroplane would in ordinary conditions change its tilt and thereby alter the direction of the centrifugal fling before the displacement of the counterbalance had proceeded sufficiently far to rotate the dip-magnet to a degree which would invalidate the indications given by it.

When the apparatus is inclined in any direction, the magnet will continue to dip to the pole, carrying with it the indicating system, whatever the position of the container. In tilt on a N. S. axis the equatorial ring will not remain at right angles to the lubber line. But this inclination will have no effect upon the reading of the orientation degree at their point of intersection. Tilt on other axes will raise or lower the equatorial on the lubber line; but this likewise will not interfere with correct reading of the compass point.

The verticality of the apparatus, or its departure therefrom, can be ascertained from the relation of the zenith crossing of the meridional rings 6 and 7 to a point 18 marked upon the top of the glass container. Circles 19, spaced at a distance of say 10°, may be drawn concentrically to this point so as to give a scale of inclination.

In adjusting the apparatus to the angle of dip of that region of the earth where it is to be used, the N. S. meridional ring 6 is set in the slide sockets 3 and 4 to a scale of degrees 20 marked upon the meridional ring, for instance to 65° for Northern France, to 45° for Palestine, etc.

Another method of suspending the dip-magnet is that of allowing it to play within gimbal rings. This has the advantage of accuracy of registration, with the disadvantage of frictional bearings and dead-centers inherent in all gimbals. Various arrangements of pivoting on this principle are possible, one convenient form of which will now be explained in detail.

In the appended illustrations Fig. 3 is a side view of an apparatus of this type looking east. Fig. 4 is a view from above of the pivoted magnet, the inner gimbal and the equatorial ring. The strong dip-magnet 21 is pivoted in exact balance at 22 and 23 in the inner gimbal member 24 which swings on pivots 25 and 26 in the equatorial ring 27. To this equatorial ring is attached a vertical frame 28 pivoted in the zenith at 29 and the nadir at 30 to a fixed support 31,—thus completing a triple gimbal in which the dip-magnet is free to rotate in any direction. To the ends of the magnet is attached, rigidly but adjustably, by means of the slide sockets 32 and 33, a light ring 34 in the N. S. meridian at the zenith of which is a verticality indicating disk 35 counterbalanced at the nadir by a counterweight 36. Upon this ring 34 is engraved a scale of degrees 37 to which it is set in accordance with the angle of dip obtaining at that region of the earth where the apparatus is to be used.

To prevent the independent rotation of the magnet 21 on its own axis the counterweight 36 may be made very slightly heavier than the indicating disk 35, the center of gravity of the operative system being thereby lowered in accordance with the principle which has been explained above in reference to the counterweight 8, Fig. 1. Or, alternatively, two light secondary magnets 38 and 39 may be rigidly attached to the inner gimbal member 24 in a position normally horizontal and serve to retain this member within certain limited angles of tilt, in a northern orientation, thereby fulfilling the same requirements of preventing the rotation of the dip-magnet on its own axis. It is to be observed that these limitations of the controlling action of the secondary magnets will depend, not only upon the angle of dip at that part of the earth's surface where the apparatus is used, but also upon the direction and the degree of tilt to which the apparatus is subjected. Obviously, if the apparatus be revolved around a N. S. axis,— or, as it may be otherwise expressed, tilted to the E. or W., a complete revolution may be effected without diminution of this control, inasmuch as the dip-magnet 21 will swing together with the inner gimbal 24 upon the pivots 25 and 26. But if the apparatus be tilted to the S. the secondary magnets will, when the angle of their inclination equals the complement (*i. e.* the difference between the angle of dip and ninety degrees), be brought into a position at which they are at right angles to the line of magnetic attraction and hence can exercise no directive force, while if this tilt be increased beyond this point the directive force will be reversed. When the apparatus is tilted to the N. the critical point of reversal will, as will be readily understood, be reached only when the tilt equals the angle of dip plus ninety degrees. Tilts on intermediate axes will give intermediate results. These facts will have to be taken into account in reading the indications given by apparatus of this type: it being borne in mind that the reversal will always amount to exactly one-half a revolution of the equatorial 27, and that this reversal will involve no error of indication as regards the direction of N. and S. when the apparatus is upside down.

When the angle of tilt, on any axis, is more than 90° and less than 270°, then the N. end of the magnet will be nearer to the eye of the observer than the S. end (it being assumed that the position of the observer with respect to the container remains unchanged and that he constantly views the magnet in the line of its normal dip), and this inverted position of the magnet may be rendered more readily recognizable by making the two ends of the bar of different colors. In like manner sections of the meridional indicating ring 34 may be differentiated by various methods of marking and coloration. Departure from verticality may be gaged by concentric circles at the zenith, and the orientation degrees upon the equatorial ring may be read against a vertical lubber line: these being marked on a container constructed like that designated by reference numbers 9 to 19 in Fig. 1, but not shown in Fig. 3. Furthermore this container may advantageously be filled with a suitable fluid for damping the oscillations of the magnet, and for taking its weight, or a portion thereof, from the bearings.

With the system of magnetic control the operative parts of the apparatus can be constructed in an all-round balance which is absolute and complete: being thus, within the given limits of tilt, theoretically as well as practically freed from the influence of even the greatest and most prolonged centrifugal fling.

It will be noted that in the form of apparatus described the swing of the dip-magnet does not allow it to approach to or recede from the parallel planes in which the secondary fixed magnets are situated, disturbance through interference being thus minimized.

What I claim as my invention and desire to secure by Letters Patent is:—

1. In an instrument for indicating verticality or orientation the combination of a dip-magnet, a frame or casing relatively to which the dip-magnet is free to swing in all directions, means for preventing the independent rotation of the dip-magnet about its own axis and means whereby the relative displacement of the frame or casing and the dip-magnet may be observed for the purpose set forth.

2. In an instrument for indicating verticality or orientation the combination of a dip-magnet mounted within a plurality of rings forming an armillary sphere, a frame or casing containing the dip-magnet and sphere which are free to swing in any direction relatively to the casing, means for preventing the independent rotation of the dip-magnet about its own axis and means whereby the relative displacement of the frame or casing and the dip-magnet may be observed for the purpose set forth.

3. In an instrument for indicating verticality or orientation the combination of a dip-magnet adjustably mounted within a plurality of rings forming an armillary sphere, a frame or casing containing the dip-magnet and sphere which are free to swing in any direction relatively to the casing, means for preventing the independent rotation of the dip-magnet about its own axis and means whereby the relative displacement of the frame or casing and the dip-magnet may be observed for the purpose set forth.

4. In an instrument for indicating verticality or orientation a dip-magnet and a float mounted within a plurality of rings forming an armillary sphere, a transparent casing containing the dip-magnet, float and sphere and adapted to contain liquid in which the dip-magnet, the float and the sphere float so that the dip-magnet is free to swing in any direction relatively to the casing, means for preventing the independent rotation of the dip-magnet about its own axis and means whereby the relative displacement of the frame or casing and the dip-magnet may be observed for the purpose set forth.

5. In an instrument for indicating verticality or orientation the combination of a dip-magnet a frame or casing relatively to which the dip-magnet is free to swing in all directions, controlling magnets so disposed as to prevent the dip-magnet from independent rotation about its own axis and means whereby the relative displacement of the frame or casing and the dip-magnet may be observed for the purpose set forth.

6. In an instrument for indicating verticality or orientation the combination of a dip-magnet adjustably mounted in a ring, a frame in which the dip-magnet and its ring are pivotally mounted, a containing ring in which said frame is mounted in gimbals on a horizontal axis, an outer frame or casing in which said containing ring is mounted in gimbals on a vertical axis, means for preventing the independent rotation of the dip-magnet about its own axis and means whereby the displacement of the dip-magnet relatively to the containing ring and of the containing ring relatively to the outer frame or casing may be observed for the purpose set forth.

7. The combination with a body such as an aeroplane movable in any direction in space of a frame or casing fixed to the body, a dip-magnet free to swing in any direction relatively to the frame or casing, means for preventing the independent rotation of the dip-magnet on its own axis, and means moving with the dip-magnet and serving as indicators of verticality and orientation respectively.

In testimony whereof I have hereunto set my name to this specification.

JOSEPH THACHER CLARKE.